US007617581B2

(12) United States Patent
Kciuk et al.

(10) Patent No.: US 7,617,581 B2
(45) Date of Patent: Nov. 17, 2009

(54) STAPLER WITH ILLUMINATED STAPLING POSITION

(75) Inventors: Jennifer A. Kciuk, East Rochester, NY (US); Erwin Ruiz, Rochester, NY (US); John T. Buzzelli, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 654 days.

(21) Appl. No.: 11/370,510

(22) Filed: Mar. 7, 2006

(65) Prior Publication Data

US 2007/0209197 A1 Sep. 13, 2007

(51) Int. Cl.
*B23P 11/00* (2006.01)
*B23P 19/00* (2006.01)

(52) U.S. Cl. .......................................... 29/432; 29/798

(58) Field of Classification Search ................... 29/432, 29/432.1, 525.01, 525.05, 798, 720; 227/120
See application file for complete search history.

(56) References Cited

U.S. PATENT DOCUMENTS

| | | | | |
|---|---|---|---|---|
| 3,888,585 | A * | 6/1975 | Cross | 355/75 |
| 5,595,336 | A | 1/1997 | Everdyke | |
| 6,811,070 | B2 * | 11/2004 | Takada | 227/120 |
| 2005/0242153 | A1 * | 11/2005 | Adams et al. | 227/120 |

* cited by examiner

*Primary Examiner*—John C Hong
(74) *Attorney, Agent, or Firm*—Fay Sharpe LLP

(57) ABSTRACT

With a stapler having a fixed stapling position of its stapling head, in which a set of sheets to be stapled is inserted and at least partially manually repositioned under the stapling head to control the actual staple insertion position, an externally visible illuminated line is provided on the set of sheets being repositioned under the staple head, which illuminated line is located directly at the fixed stapling position of the stapling head, irrespective of the manual repositioning of the sheets being stapled, to thereby provide a clearly visible and accurate indication of a selected staple insertion position before actual stapling.

8 Claims, 3 Drawing Sheets

STAPLER WITH ILLUMINATED STAPLING POSITION

By way of background and possible optional combination with the disclosed embodiment is a commonly assigned U.S. Pat. No. 5,595,336 issued Jan. 21, 1997 to Wayne D. Everdyke entitled "SAFETY STAPLER," incorporated by reference herein. However, the presently disclosed embodiment can be used with many different types of staplers, particularly power driven or automatic staplers, for enhanced user friendliness and improved staple positioning accuracy in stapled print media and other document sheets.

A very frequently encountered operational failure of staplers by customers and users is due to not being able to see exactly where the staple is going to go into the sheets when inserting the set of sheets to be stapled into the stapler. This is particularly frustrating when the misplaced inserted staple obscures or covers up text on the face document, extends outside of one edge of the sheets, or is so close to one edge of the sheets as to allow stapled sheets to easily tear off. The customer then has to tediously remove the staple and try to staple the sheets again correctly. However, the unsightly original staple holes are still present, and sometimes other damage is done to the sheets. The disclosed embodiments allow the stapler user to actually see where the staple will be inserted into the set of sheets as those sheets are inserted into the stapler, but before the staple is actually inserted, and thus to be able to adjust the stapling position for the set before the staple is actually inserted.

A specific feature of the embodiments disclosed herein is to provide a sheets stapling system with a stapling head having a fixed stapling position, in which a set of sheets to be stapled together is manually insertable and at least partially manually repositionable under said stapling head fixed stapling position for the insertion of staples from said stapling head at said fixed stapling position into said set of sheets at a staple insertion position determined by the manual repositioning of said set of sheets under said staple head, including a staple insertion position illumination system, said staple insertion position illumination system projecting an externally visible illuminated line on said set of sheets being manually repositioned under said staple head, said visible illuminated line being located at said fixed stapling position of said stapling head irrespective of said manual repositioning of said set of sheets being stapled.

Further specific features disclosed in the embodiments herein, individually or in combination, include those wherein said externally visible illuminated line on said set of sheets from said staple insertion position illumination system corresponds directly to the length and position of said inserted staples at said stapling head fixed stapling position; and/or wherein said staples have staple heads, and wherein said externally visible illuminated line on said set of sheets is in the exact position of said stapling head fixed stapling position, and wherein said externally visible illuminated line on said set of sheets substantially corresponds to said staple head of said inserted staples; and/or wherein said staple insertion position illumination system comprises at least two illumination sources mounted on opposite sides of said stapling head and aimed angularly downward to illuminate only said externally visible illuminated line at said fixed stapling position of said stapling head; and/or wherein said stapling system includes an electrically powered stapler driver and a manual switch is provided to actuate said electrically powered stapler driver after said manual repositioning of said set of sheets under said staple head; and/or wherein said stapling system further includes a transparent cover over said stapling head; and/or an improved method of sheets stapling with a stapling head having a fixed stapling position, in which a set of sheets to be stapled together is manually inserted and at least partially manually repositioned under said stapling head fixed stapling position, and then a staple is inserted from said stapling head at said fixed stapling position into said set of sheets at a staple insertion position determined by said manual repositioning of said set of sheets under said staple head, wherein an externally visible illuminated line on said set of sheets being manually repositioned under said staple head is optically projected thereon, said visible illuminated line being located at said fixed stapling position of said stapling head irrespective of said manual repositioning of said set of sheets being stapled to provide a clearly visible and accurate indication of a manually selected staple insertion position; and/or wherein said externally visible illuminated line on said set of sheets corresponds directly to the length and position of said inserted staples at said stapling head fixed stapling position; and/or wherein said staple insertion is manually actuated in response to observation of said externally visible illuminated line on said set of sheets.

The term "sheet" as used herein refers to a usually flimsy physical sheet of paper, plastic, or other suitable physical substrate for printed images, or the like. The terms stapling or stapler in this case may also broadly include what is sometimes called stitching or stitchers, which can cut, form, and insert staples from a continuous wire spool supply rather than from staple sticks.

As to specific components of the subject apparatus or methods, or alternatives therefor, it will be appreciated that, as is normally the case, some such components are known per se in other apparatus or applications, which may be additionally or alternatively used herein, including those from art cited herein. For example, it will be appreciated by respective engineers and others that many of the particular components, mountings, actuations, or drive systems illustrated in the embodiment examples herein are merely exemplary, and that the same and functions could be provided by many other known or readily available alternatives. All cited references, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operations or methods described in the examples below, and the claims. Thus, they will be better understood from this description of these specific embodiments, including the drawing figures (which are approximately to scale) wherein:

Figure 1:
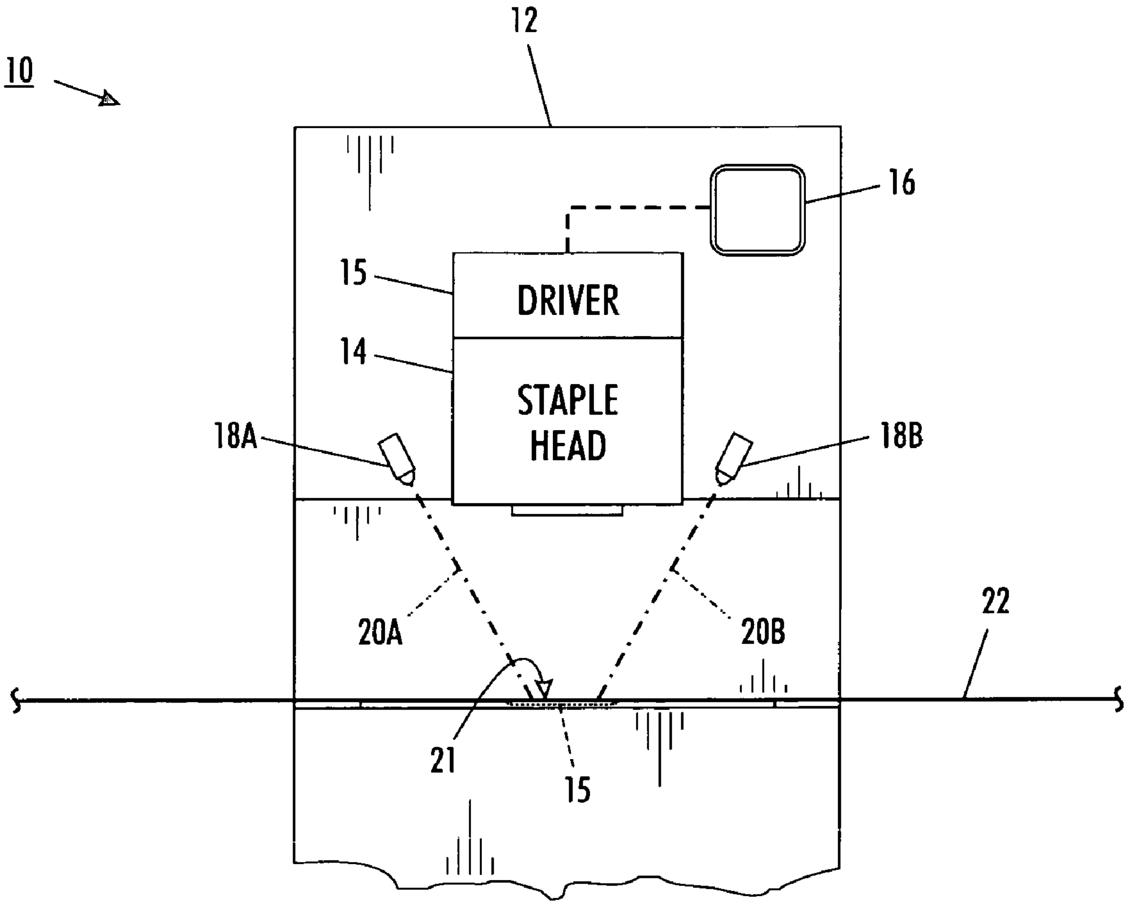
FIG. 1 is a schematic frontal view of an exemplary stapler unit.
Figure 2:
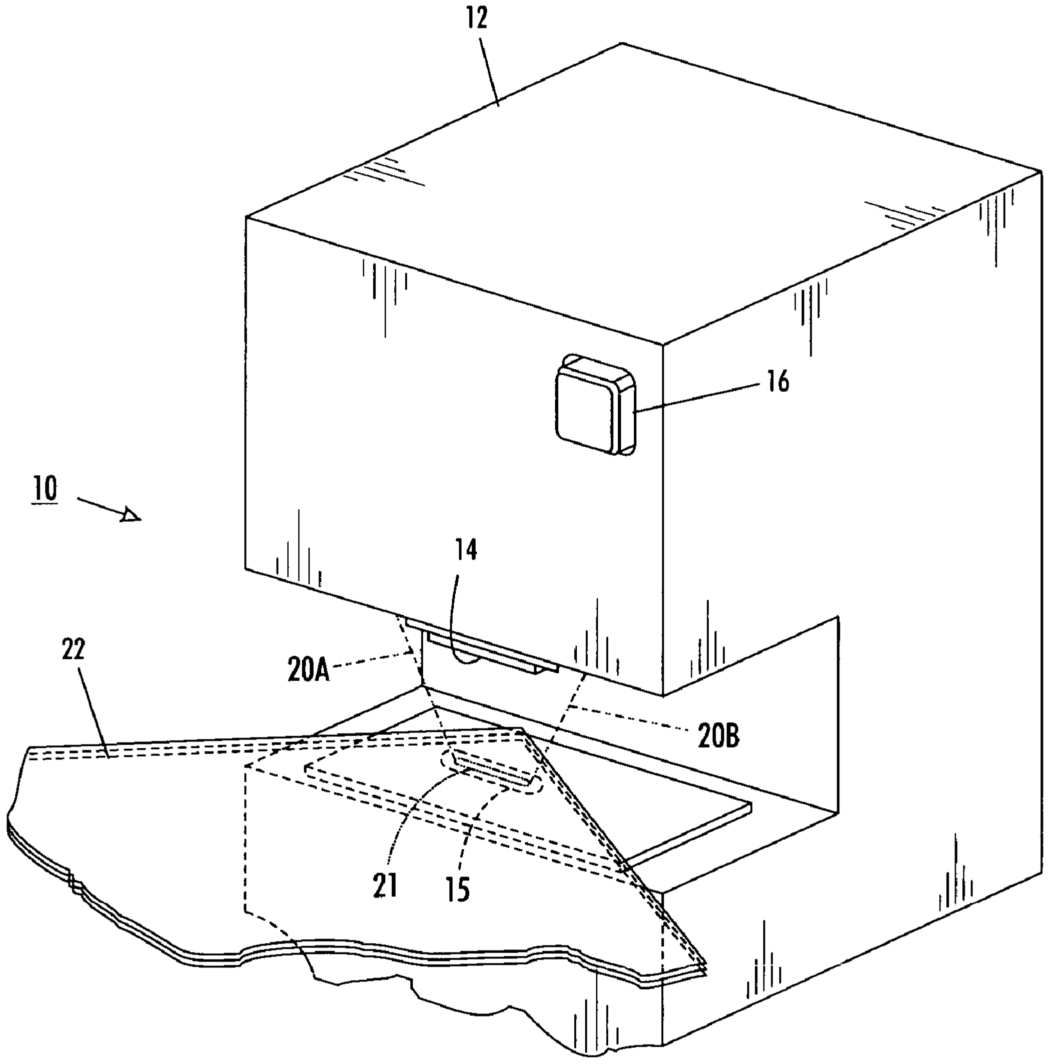
FIG. 2 is a perspective view thereof.
Figure 3:
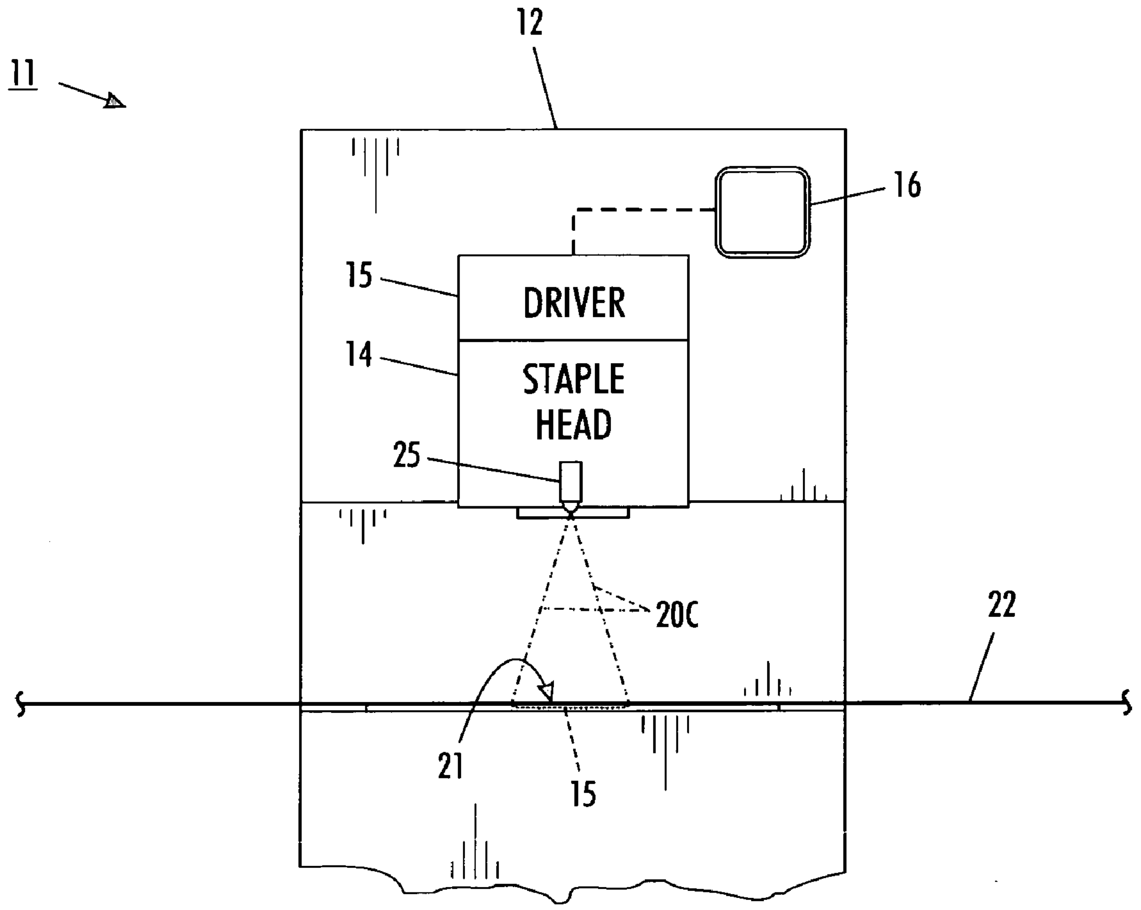
FIG. 3 is a modified version of FIGS. 1 and 2.

Describing now in further detail the exemplary improved stapler embodiments with reference to the Figures, there is shown in FIGS. 1 and 2 one example of an automatic stapler 10, and in FIG. 3 another example 11. Either may have a clear transparent plastic cover 12 over the staple head 14 and the (optional, conventional) electrically powered staple head driver 15, which are conventionally driving conventional standard width staples into a set of sheets 22 that is otherwise conventionally inserted into the initially open jaws of the stapler 10 or 11 between the staple head 14 and its conventional opposing staple forming anvil 15.

As noted, an issue with most current manually inserted sheet sets automatic staplers, including those in use on many xerographic printers and copiers, is that the staple is often not accurately positioned. The user is often frustrated in guessing wrong where the staple may actually end up in their stapled sheet set.

Disclosed in these examples 10 and 11 is a system of low-cost, low power, illumination, such as the two laser LED's 18A and 18B of system 10, or the one LED 25 of system 11 in FIG. 3, projecting an illuminated line 21 on the top sheet of the set of sheets 22 inserted to be stapled, inside the open stapler jaw, at the actual stapling location if stapling is actuated in that position of the inserted sheet set 22. The stapler jaws are normally open wide enough to allow an operator view of this illuminated stapling area 21. The clear plastic cover 12 over the stapler head, instead of a solid cover, protects the user but assists the user in seeing where the document set 22 is being placed under the staple head 14 relative to the illuminated staple position 21. The customer can then press a stapler actuation button 16 when the desired stapling position for that set is illuminated.

That is, once the set 22 is moved under the stapler head 14 by the operator, but before actual stapling, the aimed LED(s), or other suitable illumination system, projects onto the top of the set 22 a visible line 21 which may correspond in position, length and even line-width to an actual inserted staple, at precisely where the actual staple would be placed if then driven. A dual laser system such as the two laser LED's 18A and 18B of system can employ two line generators mounted on angles, such as is shown in FIGS. 1 and 2. Each of those laser projected lines can define one end of the staple location and can be coincident toward the center of the staple location. In the alternative system 11 of FIG. 3 a single line generator LED 25 can be appropriately mounted in the print head or cover. For example, a World Star Tech Class 1 (IEC-European) laser part number FLL5-0.4P-650-30 which can project a 13.5 mm line when mounted 25 mm from the surface where the line is to be projected. A mounting screw can be optionally provided to adjust the height of this laser LED 25, which will adjust the line 21 length, if and when a different staple with a different length of staple head might be used. Some line generator lasers are also available with built-in line width adjustments. Once the user is satisfied with the user selected stapling position, by moving the set 22 into the desired stapling position and adjusting its position with that illuminated line 21 guidance, a button 16 may be pressed to initiate the actual staple driving in the illuminated line 21 position.

As shown in FIGS. 1 and 2, the two laser LEDs 18A, 18B may be mounted next to the staple head, on opposite sides thereof, with opposing downward angles 20A, 20B. These two LEDs can project beams 20A, 20B that will diverge. This beam diversion can enable the two LEDs 18A, 18B to project a single line onto the top paper that resembles an image of a staple head. Once the user is satisfied with the selected staple location that is being visually projected from these LEDs, the user can actuate any switch to allow the paper to be stapled at that location. Alternatively, a known time delay feature may be added to enable known automatic stapling triggered by the insertion of the sheets themselves—by the inserted sheets moving a known switch located in or behind the stapler jaws which causes stapling to occur automatically, but in this case only after a sufficient time delay allows the user to align the sheets relative to the illuminated staple position.

The claims, as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants or others. Unless specifically recited in a claim, steps or components of claims should not be implied or imported from the specification or any other claims as to any particular order, number, position, size, shape, angle, color, or material.

What is claimed is:

1. A sheets stapling system with a stapling head having a fixed stapling: position, in which a set of sheets to be stapled together is manually insertable and at least partially manually repositionable under said stapling head fixed stapling position for the insertion of staples from said stapling head at said fixed stapling position into said set of sheets at a staple insertion position determined by the manual repositioning of said set of sheets under said staple head, including a staple insertion position illumination system, said staple insertion position illumination system projecting an externally visible illuminated line on said set of sheets being manually repositioned under said staple head, said visible illuminated line being located at said fixed stapling position of said stapling head irrespective of said manual repositioning of said set of sheets being stapled, wherein said staple insertion position illumination system comprises at least two illumination sources mounted on opposite sides of said stapling head and aimed angularly downward to illuminate only said externally visible illuminated line at said fixed stapling position of said stapling head.

2. The sheets stapling system of claim 1, wherein said externally visible illuminated line on said set of sheets from said staple insertion position illumination system corresponds directly to the length and position of said inserted staples at said stapling head fixed stapling position.

3. The sheets stapling system of claim 1, wherein said staples have staple heads, and wherein said externally visible illuminated line on said set of sheets is in the exact position of said stapling head fixed stapling position, and wherein said externally visible illuminated line on said set of sheets substantially corresponds to said staple head of said inserted staples.

4. The sheets stapling system of claim 1, wherein said stapling system includes an electrically powered stapler driver and a manual switch is provided to actuate said electrically powered stapler driver after said manual repositioning of said set of sheets under said staple head.

5. The sheets stapling system of claim 1, wherein said stapling system further includes a transparent cover over said stapling head.

6. An improved method of sheets stapling with a stapling head having a fixed stapling position, in which a set of sheets to be stapled together is manually inserted and at least partially manually repositioned under said stapling head fixed stapling position, and then a staple is inserted from said stapling head at said fixed stapling position into said set of sheets at a staple insertion position determined by said manual repositioning of said set of sheets under said staple head, wherein an externally visible illuminated line on said set of sheets being manually repositioned under said staple head is optically projected thereon, said visible illuminated line being located at said fixed stapling position of said stapling head irrespective of said manual repositioning of said set of sheets being stapled to provide a clearly visible and accurate indication of a manually selected staple insertion position, said illuminated line from at least two illumination sources mounted on opposite sides of said stapling head and aimed angularly downward to illuminate only said externally visible illuminated line at said fixed stapling position of said stapling head.

7. The improved method of sheets stapling of claim 6, wherein said externally visible illuminated line on said set of sheets corresponds directly to the length and position of said inserted staples at said stapling head fixed stapling position.

8. The improved method of sheets stapling of claim 6, wherein said staple insertion is manually actuated in response to observation of said externally visible illuminated line on said set of sheets.

* * * * *